Figure 1:
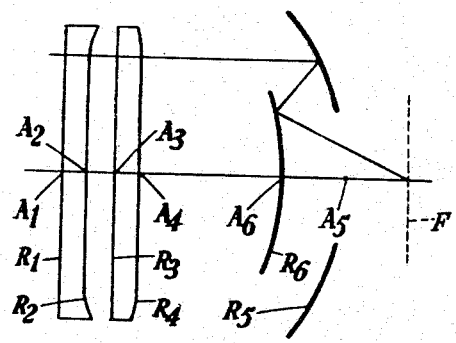

INVENTOR
A. WARMISHAM
Attorneys

Dec. 7, 1943.  A. WARMISHAM  2,336,379
OPTICAL SYSTEMS
Filed May 22, 1941  2 Sheets-Sheet 2

INVENTOR.
A. WARMISHAM.
BY
ATTORNEY

Patented Dec. 7, 1943

2,336,379

UNITED STATES PATENT OFFICE 2,336,379

OPTICAL SYSTEM

Arthur Warmisham, Leicester, England, assignor to Taylor, Taylor & Hobson Limited, Leicester, England, a British company Application May 22, 1941, Serial No. 394,709
In Great Britain May 2, 1940

15 Claims. (Cl. 88—57)

This invention relates to optical systems for use as optical objectives for various purposes, including photographic and projection objectives and microscope and telescope objectives. Such objectives have hitherto usually been constituted by a system of refracting lenses, and serious difficulties have consequently arisen in achieving any refined correction of chromatic aberration. The use of reflecting surfaces would avoid such difficulties, and the present invention has for its object to provide a satisfactory objective in which the optical power is supplied by curved reflecting surfaces.

In order to correct a concave mirror for spherical aberration it has been usual to make it paraboloidal, but a paraboloidal mirror has serious uncorrected coma and astigmatism and can only be used in practice for a very small angular field.

It has recently been discovered that a concave spherical mirror can be simultaneously corrected for spherical aberration, coma and astigmatism by providing in front of the mirror at or near its centre of curvature a correcting element in the form of a substantially afocal plate constituted by a deformed plane parallel plate. Such an arrangement is of restricted practical value since the focal surface of the mirror is a spherical surface concentric with the mirror and of half the radius thereof.

A more particular object of the invention is to extend such an arrangement to produce an objective which will be well-corrected not only for spherical and chromatic aberrations, coma and astigmatism, but also for curvature of field, and will have small residual distortion. To this end the optical system according to the invention may comprise two or more spherical reflecting surfaces, of which at least one is convergent and at least one divergent, and means for effecting correction of the spherical aberration, coma and astigmatism of such surfaces, such means including one or more substantially afocal correcting surfaces each intersecting the optical axis at or near the "equvalent centre of curvature" of one of the spherical reflecting surfaces, the combination being such as to produce an approximately flat image field.

It is to be understood that the phrase "equivalent centre of curvature" is herein used to mean either the geometrical centre of curvature of the surface or, if there are any intervening elements, the image of such centre formed by paraxial imagery by such intervening elements.

Each correcting surface may be paraxially afocal, in which case it will consist of a surface of revolution generated by rotation about the $x$-axis (that is the optical axis of the system) of a curve of the form $$x = Ay^4 + By^6 + \ldots \text{ higher even powers of } y$$

wherein the coefficients A, B . . . (which determine the extent of deformation of the surface from a plane surface) are such that the surface will correct for the spherical aberration, coma and astigmatism of the spherical reflecting surface or surfaces. The coefficient A, which may be termed the coefficient of the first-order deformation, is associated with the correction of the first-order aberrations, and the coefficient B of the second-order deformation is likewise associated with the correction of the second-order aberrations, and so on.

Each afocal correcting surface may be constituted by one of the surfaces of a plate through which the light is transmitted, or alternatively may be in the form of a reflecting surface.

In the case of a correcting surface, through which the light is transmitted, it may be preferable, instead of using a paraxially afocal surface, to make the correcting surface afocal for a selected zone such that the chromatic difference of spherical aberration is reduced to a minimum. This necessitates that the surface shall have slight curvature at its axial point and the equation of the generating curve will become $$x = \tfrac{1}{2}\frac{y^2}{b} + Ay^4 + \ldots \text{ higher powers of } y$$

wherein $b$ is a constant large in comparison with the equivalent focal length of the objective. For such a surface to be substantially afocal for a selected zone of radius $h$, the quantities $b$, $A$ and $h$ should be inter-related by the equation $$b = -\frac{1}{4Ah^2}$$

Figure 2:
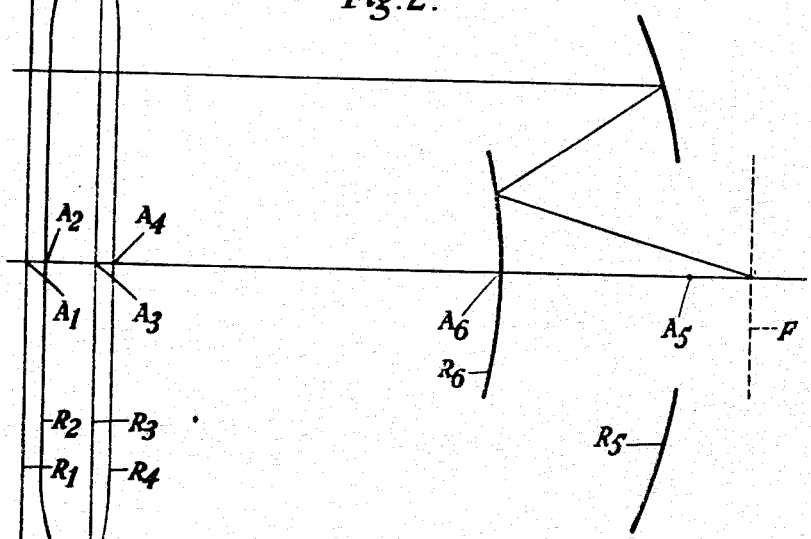
Figure 3:
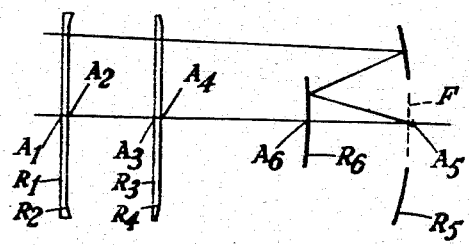
Figure 4:
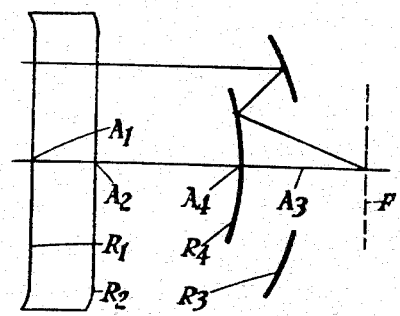
Figure 5:
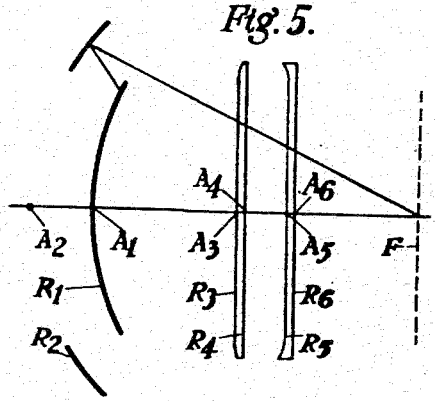
Figure 6:
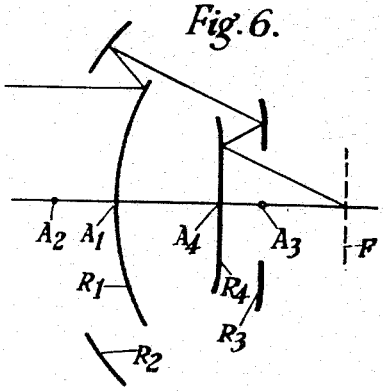
Figure 7:
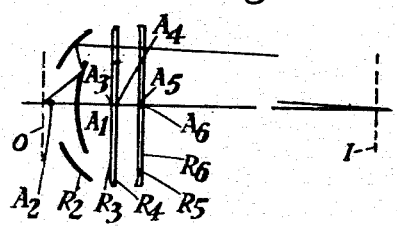
Figure 8:
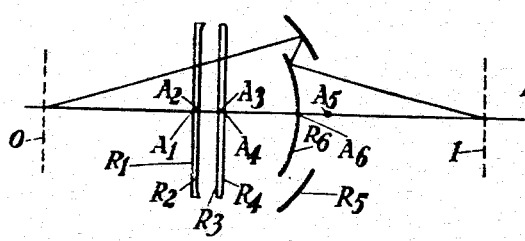
Figure 9:
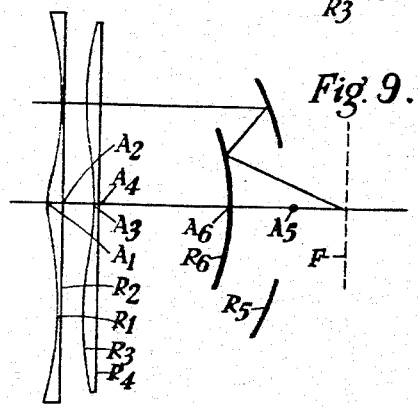
Figure 10:
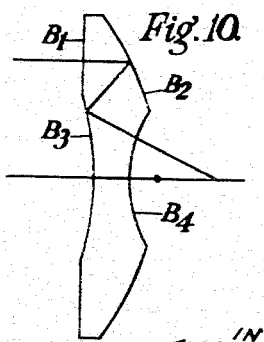

The invention may be carried into practice in various ways, but some convenient arrangements according thereto are diagrammatically illustrated in the accompanying drawings, in which Figure 1 shows a preferred arrangement of objective intended more especially as an anastigmatic photographic objective, Figures 2 and 3 respectively show modifications of the arrangement of Figure 1, Figure 4 illustrates a further variant of the arrangement of Figure 1, Figures 5 and 6 respectively show two further arrangements of photographic objective, Figure 7 illustrates an arrangement suitable for a microscope objective, Figure 8 shows an objective arranged for equal scale copying, Figure 9 shows another modification of the arrangement of Figure 1, and Figure 10 illustrates one practical constructional form for a pair of reflecting surfaces, as applied by way of example to the arrangement of Figure 1.

In the arrangement of Figure 1, the objective comprises two spherical mirrors, one concave and one convex and two correcting plates. The light after passing through the two plates $R_1R_2$ and $R_3R_4$ is reflected at the concave mirror $R_5$, which is annular in form, and thence after reflection at the convex mirror $R_6$ passes through the aperture in the concave mirror to the focal plane F. The two correcting plates are thin with their front surfaces $R_1$ and $R_3$ plane and their rear surfaces $R_2$ and $R_4$ deformed from the true plane to an extent sufficient to correct the aberrations. Thus the rear surface $R_2$ of the front plate is slightly convex to the front and is disposed with its vertex $A_2$ approximately at the equivalent centre of curvature of the concave mirror $R_5$ (allowance being made for the fact that part of the path of the light between the surfaces $R_2$ and $R_5$ is constituted by the glass plate $R_3R_4$), the shape of the surface $R_2$ being such that its spherical aberration, coma and astigmatism substantially balance out those of the mirror $R_5$. Similarly the rear surface $R_4$ of the second plate serves to correct the aberrations of the convex miror $R_6$. In this case it is of interest to note that the only optical path between the surfaces $R_4$ and $R_6$ includes reflection at the surface $R_5$ and it is therefore necessary to correlate the surface $R_6$ with the paraxial image of $R_4$ formed by reflection in the mirror $R_5$, and such paraxial image intersects the axis approximately at the centre of curvature of the surface $R_6$. The field curvature of the concave mirror $R_5$ is likewise opposite to and more or less equal to that of the convex mirror $R_6$ so as to give an approximately flat image surface. Thus the only first order residual aberration is distortion and this can be reduced to a small value.

Numerical data for the example shown in Figure 1 are given in the following table, and it will be noted that this example has been calculated to give correction not only for first order aberrations but also for the higher order aberrations and in fact gives a high degree of correction for all the aberrations.

In this table (as also in the other tables set out below) $R_1R_2$ . . . represent the radii of curvature of the individual surfaces counting from the front (the positive sign indicating that the surface is convex to the front and the negative that it is concave thereto), and $D_{12}D_{23}$ . . . represent the distances between the vertices $A_1A_2$, $A_2A_3$ . . . of such surfaces (the minus sign for the distance $D_{56}$ indicating that the sixth surface is in front of the fifth surface). In these tables the equation to the generating curve is given instead of the radius of curvature for each of the correcting surfaces $R_2R_4$, the surface being generated by revolution of the curve about the optical axis. The equations are given in Cartesian coordinates with origin at the vertex $A_2$ or $A_4$ of the surface and with the $x$-axis coincident with the optical axis.

*Example I*

| Radius | Thickness or air separation | Refractive index $n_D$ | Abbé V number |
|---|---|---|---|
| $R_1 = \infty$ | | | |
| | $D_{12} = .1$ | 1.613 | 59.3 |
| $R_2 = x = .4077y^4 + .3823y^6 + 1.0986y^8 + 1.5341y^{10}$ | | | |
| | $D_{23} = .1047$ | | |
| $R_3 = \infty$ | | | |
| | $D_{34} = .1$ | 1.613 | 59.3 |
| $R_4 = x = -.2293y^4 - .16252y^6 - .7662y^8 - .58557y^{10}$ | | | |
| | $D_{45} = .8333$ | | |
| $R_5 = 1.0$ | | | |
| | $D_{56} = -.25$ | | |
| $R_6 = -1.0$ | | | |

Distance of focal plane F from $R_6 = +.50$.
Equivalent focal length 1.000.

In general, the desired substantially flat image field is primarily produced by the curvature and position of the spherical reflecting surfaces, but it will be appreciated that allowance will have to be made for the residual field curvature aberration contributed by the correcting element or elements. Neglecting the effect of the correcting element or elements, the theoretical requirement to produce an image field flat to the first order when two spherical reflecting surfaces are used in that the curvature of the convergent spherical reflecting surface should be equal to that of the divergent spherical reflecting surface. The corresponding condition when there are more than two spherical reflecting surfaces is that the sum of the curvatures of the divergent surfaces should be equal to that of the convergent surfaces. It will be convenient to use the term "total curvature" to represent either the curvature of the surface, if there is only one surface, or the sum of the curvatures of all the surfaces if there are two or more surfaces, and it will be appreciated that when a correcting surface having slight axial curvature so as to be afocal for a selected zone is employed, then the imaginary slightly spherical surface which osculates the correcting surface at the vertex must be taken into account as one of the surfaces in determining the total curvature.

Thus the theoretical condition for a flat image field, as far as first order aberrations are concerned, is that the total curvature of the divergent surface or surfaces should be equal to that of the convergent surface or surfaces, in each case including the contribution of any correcting surfaces having slight axial curvature. Expressed mathematically, the curvature of the image freed from first order astigmatism, due to reflection at a spherical surface of radius $r$, is given by the expression $$p = \frac{2}{r}$$

and is to be taken as positive if the reflection is from the concave side of the surface and negative if the reflection is from the convex side. Similarly the contribution to the curvature of the final image due to refraction at a spherical surface is given by $$p = \left(\frac{1}{n} - \frac{1}{n^1}\right)\frac{1}{r}$$

in which $n$ and $n^1$ are the refractive indices of the media which the light traverses respectively before and after refraction. In this case $r$ is taken as positive if the surface is convex to the incident light and negative if the surface is concave to the incident light. For a correcting surface having slight axial curvature as defined by the equation previously given, $r$ will of course be equal to $b$. The theoretical condition just mentioned then becomes $Ep=0$.

In practice some latitude from this condition will often be preferable, partly to accommodate any residual field curvature aberration contributed by the deformations of the correcting surfaces, partly to give improved correction of other aberrations at the expense of a slight departure from a truly flat field, and partly to counteract the relatively large effect of the higher order aberrations at moderate angles. It is, however, preferable that the total curvature of the divergent surface or surfaces should be not less than 80% and not more than 125% of the total curvature of the convergent surface or surfaces, whilst the difference between such total curvatures should be not greater than 15% of the equivalent power of the whole objective. It is to be understood that the term "power" as herein used means the reciprocal of the focal length.

In Example I the correcting plates are paraxially afocal and the two mirrors $R_5R_6$ have equal and opposite curvature, thus giving exact balancing of the first order field curvature aberration. Examples II and III, which are shown in Figures 2 and 3 and of which approximate numerical data are given in the following tables, are of the same general type as Example I but are arranged to have a small residual under-corrected or over-corrected Petzval curvature. Thus Example II shows slight over-correction of the Petzval curvature (which means that the image surface in the region of the axis is slightly convex towards the incident light), the curvature of the concave mirror being 80% of that of the convex mirror, whilst Example III shows under-correction of the Petzval curvature, the curvature of the convex mirror being 80% of that of the concave mirror $R_5$. In the approximate data given for these examples the mean refractive index $n_D$ of the glass used for the correcting plates is taken as 1.5 and the thickness of each plate is assumed to be negligibly small.

*Example II*

| Radius | Thickness or air separation | Refractive index $n_D$ |
|---|---|---|
| $R_1=\infty$ | $D_{12}=0$ | 1.5 |
| $R_2=x=+.5y^4+$higher order terms. | $D_{23}=.08$ | |
| $R_3=\infty$ | $D_{34}=0$ | 1.5 |
| $R_4=x=-.225y^4+$higher order terms. | $D_{45}=.92$ | |
| $R_5=-1.0$ | $D_{56}=-.30$ | |
| $R_6=-.8$ | | |

Distance of focal plane $F$ from $R_6=+.40$.
Equivalent focal length 1.000.

*Example III*

| Radius | Thickness or air separation | Refractive index $n_D$ |
|---|---|---|
| $R_1=\infty$ | $D_{12}=0$ | 1.5 |
| $R_2=x=+.198y^4+$higher order terms. | $D_{23}=.35$ | |
| $R_3=\infty$ | $D_{34}=0$ | 1.5 |
| $R_4=x=-.071y^4+$higher order terms. | $D_{45}=1.01$ | |
| $R_5=-1.36$ | $D_{56}=-.41$ | |
| $R_6=-1.70$ | | |

Distance of focal plane $F$ from $R_6=+.40$.
Equivalent focal length 1.000.

The two correcting surfaces in each of these examples have been described as on the rear sides of the thin plates, but this is not essential and either or both of them may, if desired, be on the front sides, provided that the surfaces themselves are in the correct positions. It will be apparent that, if the front plate is reversed in this way, the arrangement may be modified by joining the two plates into a single plate of such thickness as to give the appropriate effective separation between the surfaces as shown in Figure 4, and approximate numerical data for one example of this are given in the following table.

*Example IV*

| Radius | Thickness or air separation | Refractive index $n_D$ |
|---|---|---|
| $R_1=x=-.500y^4+$higher order terms. | $D_{12}=.255$ | 1.5 |
| $R_2=x=-.281y^4+$higher order terms. | $D_{23}=.83$ | |
| $R_3=-1.0$ | $D_{34}=-.25$ | |
| $R_4=-1.0$ | | |

Distance of focal plane $F$ from $R_4=+.50$.
Equivalent focal length 1.000.

In another alternative arrangement, shown in Figure 5, the incident light falls first on a convex mirror $R_1$ and then on an annular concave mirror $R_2$ and after reflection at these mirrors passes through the two correcting plates $R_3R_4$ and $R_5R_6$ (or through a single plate bearing the two correcting surfaces) to the focal plane $F$, the arrangement thus being generally a reversal of that of Figure 1. Numerical data of one example of such an arrangement are given in the following table.

*Example V*

| Radius | Thickness or air separation | Refractive index $n_D$ |
|---|---|---|
| $R_1=+1.0$ | $D_{12}=-.25$ | |
| $R_2=+1.0$ | $D_{23}=.83$ | |
| $R_3=x=+2.5y^4+$higher order terms. | $D_{34}=0$ | 1.5 |
| $R_4=\infty$ | $D_{45}=.17$ | |
| $R_5=x=-4.51y^4+$higher order terms. | $D_{56}=0$ | 1.5 |
| $R_6=\infty$ | | |

Distance of focal plane $F$ from $R_6=+.50$.
Equivalent focal length 1.000.

In yet another variant, shown in Figure 6, the correcting surfaces are made to reflect the light instead of to transmit it. Thus, for example, in a modification of the arrangement of Example V employing reflecting correcting surfaces, the light is reflected in turn at a convex spherical mirror $R_1$, an annular concave spherical mirror $R_2$, an annular slightly concave correcting reflector, and a slightly convex correcting reflector before passing to the focal plane. Each of the two correcting reflectors is again a deformed plane surface shaped to the first order of approximation to conform to a quartic paraboloid, in a manner generally analogous to that above described. The use of reflecting correctors has the advantage of still further reducing chromatic aberration, and in fact in the case of air-separated reflecting surfaces such aberration would not arise at all.

Numerical data for one such example, having air-separated reflecting surfaces, are given in the table below.

*Example VI*

| Radius | Air separation |
|---|---|
| $R_1 = +1.0$ | |
| | $D_{12} = -.25$ |
| $R_2 = +1.0$ | |
| | $D_{23} = .83$ |
| $R_3 = x = -.625y^4 +$ higher order terms. | |
| | $D_{34} = -.17$ |
| $R_4 = x = -1.125y^4 +$ higher order terms. | |

Distance of focal plane from $R_4 = +.50$.
Equivalent focal length 1.000.

In this example the aberrations of the first surface $R_1$ are corrected by the third surface $R_3$, whose paraxial image formed by the mirror $R_2$ intersects the optical axis approximately at the centre of the surface $R_1$. Similarly the aberrations of the surface $R_2$ are balanced by those of the surface $R_4$, whose paraxial image formed by reflection at $R_3$ intersects the axis at the centre of $R_2$.

The foregoing examples have all been designed primarily as anastigmat objectives for photographic purposes, but are equally suitable for projection purposes. They may also be used as telescope objectives, although in practice the fact that the aperture is annular in these examples may occasion some inconvenience for visual observation in a telescope. The invention is however also applicable to objectives for other purposes, such for example as microscope objectives and copying objectives, and the improvement in chromatic correction is especially valuable in the case of photographic work with a microscope.

Thus most of the foregoing examples can readily be modified to give correction of first order aberrations for a high magnification such as X10 for use as microscope objectives, and the following table gives numerical data for a microscope objective adapted from a reversal of Example III above and shown in Figure 7.

*Example VII*

| Radius | Thickness or air separation | Refractive index $n_D$ |
|---|---|---|
| $R_1 = +1.70$ | | |
| | $D_{12} = -.41$ | |
| $R_2 = +1.36$ | | |
| | $D_{23} = 1.00$ | |
| $R_3 = x = +.104y^4 +$ higher order terms. | | |
| | $D_{34} = 0$ | 1.5 |
| $R_4 = \infty$ | | |
| | $D_{45} = .36$ | |
| $R_5 = x = -.259y^4 +$ higher order terms. | | |
| | $D_{56} = 0$ | 1.5 |
| $R_6 = \infty$ | | |

Distance of object plane in front of $R_1 = .500$.
Distance of image plane behind $R_6 = 23.6$.
Equivalent focal length 1.000.

In a similar way the examples of photographic objective can for the most part be readily modified for copying purposes, and Figure 8 shows an adaptation of Example I for equal scale copying, for which approximate numerical data are given in the following table. This example gives complete balancing of all the first order aberrations with the exception that there is a slight residual distortion.

*Example VIII*

| Radius | Thickness or air separation | Refractive index $n_D$ |
|---|---|---|
| $R_1 = \infty$ | | |
| | $D_{12} = 0$ | 1.5 |
| $R_2 = x = +1.389y^4 +$ higher order terms. | | |
| | $D_{23} = .167$ | |
| $R_3 = \infty$ | | |
| | $D_{34} = 0$ | 1.5 |
| $R_4 = x = -.91y^4 +$ higher order terms. | | |
| | $D_{45} = .833$ | |
| $R_5 = -1.0$ | | |
| | $D_{56} = -.25$ | |
| $R_6 = -1.0$ | | |

Distance of object plane in front of $R_1 = 1.185$.
Distance of image plane behind $R_6 = 1.5$.
Equivalent focal length 1.000.

The foregoing arrangements have all been calculated with correcting surfaces paraxially afocal, but as has already been mentioned it may be preferable (when the correcting surfaces are such that the light is transmitted through them) to make such surfaces afocal for a selected zone such that the chromatic difference of spherical aberration is reduced to a minimum. The following table gives approximate numerical data by way of example for such a modification of Example I (shown in Figure 9).

*Example IX*

| Radius | Thickness or air separation | Refractive index $n_D$ |
|---|---|---|
| $R_1 = x = +.1595y^2 - .4900y^4 +$ higher order terms. | | |
| | $D_{12} = .065$ | 1.5 |
| $R_2 = \infty$ | | |
| | $D_{23} = .090$ | |
| $R_3 = x = -.0935y^2 + .2967y^4 +$ higher order terms. | | |
| | $D_{34} = .065$ | 1.5 |
| $R_4 = \infty$ | | |
| | $D_{45} = .761$ | |
| $R_5 = -.9451$ | | |
| | $D_{56} = -.227$ | |
| $R_6 = -.9091$ | | |

Distance of focal plane F from $R_6 = +.462$.
Equivalent focal length 1.000.

In this example the correcting surfaces have been made afocal for a zone of radius .4, which divides the annulus constituting the entrance pupil at $R_1$ into approximately equal areas. The correcting surfaces have slight curvature at their vertices and for relatively large apertures, such as that of Example IX, such axial curvature introduces aberrations which are not negligible. By utilising the front surfaces of the correcting plates as the correcting surfaces, it becomes possible to arrange that such aberrations of the two correcting surfaces balance one another, as in Example IX.

It will be appreciated that the foregoing arrangements have been described by way of example only and may be modified in various ways within the scope of the invention. Thus for instance the numerical examples given above have been calculated for the most part to correct for first order aberrations only, and some modifications will be required when higher order terms are considered. Such modifications will however usually involve only relatively slight numerical changes without any material alteration in the arrangement of the objective.

Again the various reflecting surfaces in the foregoing examples have been separated by air gaps, but it will be appreciated that they may, if desired, be formed as internally reflecting surfaces. Thus, for instance, as shown in Figure 10, the two spherical mirrors of Figure 1 can be formed as internally reflecting surfaces on a single piece of glass, having a plane annular entrance surface B, a concave spherical annular internally reflecting surface $B_2$ (corresponding to the surface $R_5$ of Figure 1), a convex spherical internally reflecting surface $B_3$ (corresponding to the surface $R_6$ of Figure 1) and an exit surface $B_4$, which may be (as shown) spherical and concentric with the axial focal point of the system or may be plane, within and adjacent to the annular surface $B_2$. The two internally reflecting surfaces are preferably metallised.

What I claim as my invention and desire to secure by Letters Patent is:

1. An optical objective comprising in combination a plurality of spherical reflecting surfaces in axial alignment, of which at least one is convergent and at least one divergent, and means for effecting correction of the spherical aberration, coma and astigmatism of such surfaces, the said means including at least one substantially afocal correcting surface intersecting the optical axis substantially at the equivalent centre of curvature of one of the spherical reflecting surfaces, the total curvature of the divergent surfaces being not less than 80% and not more than 125% of the total curvature of the convergent surfaces, whilst the difference between such total curvatures is not greater than 15% of the equivalent power of the whole objective.

2. An optical objective comprising in combination two spherical reflecting surfaces in axial alignment of which one is divergent and the other convergent, and two substantially afocal correcting surfaces respectively intersecting the optical axis substantially at the equivalent centres of curvature of the two spherical reflecting surfaces and acting to correct the spherical aberration, coma and astigmatism thereof, the combination being such as to produce an approximately flat image field.

3. An optical objective comprising in combination two spherical reflecting surfaces in axial alignment of which one is divergent and the other convergent, and two substantially afocal correcting surfaces respectively intersecting the optical axis substantially at the equivalent centres of the curvature of the two spherical reflecting surfaces and acting to correct the spherical aberration, coma and astigmatism thereof, the curvature of the divergent spherical surface being not less than 80% and not greater than 125% of the curvature of the convergent spherical surface whilst the difference between such curvatures is not greater than 15% of the equivalent power of the whole objective.

4. An optical objective comprising in combination a plurality of spherical reflecting surfaces in axial alignment, of which at least one is convergent and at least one divergent, and means for effecting correction of the spherical aberration, coma and astigmatism of such surfaces, the said means including a substantially afocal correcting surface intersecting the optical axis substantially at the equivalent centre of curvature of each of the spherical reflecting surfaces, and being constituted by one of the surfaces of a plate through which the light is transmitted, the combination being such as to produce an approximately flat image field.

5. An optical objective as claimed in claim 2, in which each afocal correcting surface is constituted by one of the surfaces of a plate through which the light is transmitted, the opposite surface of such plate being plane.

6. An optical objective as claimed in claim 1, in which the afocal correcting surface is constituted by a surface of revolution generated by rotation about the $x$-axis of a curve of the form $$x = Ay^4 + By^6 + \ldots + \text{higher even powers of } y$$

wherein $x$ and $y$ are the variable parameters of a Cartesian system of coordinates having origin at the vertex and with the $x$-axis coincident with the optical axis, and A, B ... are the coefficients of the powers of $y$ and are such that the surface will correct for the spherical aberration, coma and astigmatism of the associated spherical reflecting surface.

7. An optical objective as claimed in claim 1, in which the afocal correcting surface is constituted by a surface of revolution generated by rotation about the $x$-axis of a curve of the form $$x = \tfrac{1}{2}\tfrac{y^2}{b} + Ay^4 + \ldots + \text{higher powers of } y$$

wherein $x$ and $y$ are the variable parameters of a Cartesian system of coordinates having at the vertex and with the $x$-axis coincident with the optical axis, $b$ is a constant large in comparison with the equivalent focal length of the objective and A ... are the coefficients of the powers of $y$ and are such that the surface will correct for the spherical aberration, coma and astigmatism of the associated spherical reflecting surface.

8. An optical objective as claimed in claim 2, in which each afocal correcting surface is constituted by a surface of revolution generated by rotation about the $x$-axis of a curve of the form $$x = Ay^4 + By^6 + \ldots + \text{higher even powers of } y$$

wherein $x$ and $y$ are the variable parameters of a Cartesian system of coordinates having origin at the vertex and with the $x$-axis coincident with the optical axis, and A, B ... are the coefficients of the powers of $y$ and are such that the surface will correct for the spherical aberration, coma and astigmatism of the associated spherical reflecting surface.

9. An optical objective as claimed in claim 3, in which each afocal correcting surface is constituted by a surface of revolution generated by rotation about the $x$-axis of a curve of the form $$x = \tfrac{1}{2}\tfrac{y^2}{b} + Ay^4 + \ldots + \text{higher powers of } y$$

wherein $x$ and $y$ are the variable parameters of a Cartesian system of coordinates having at the vertex and with the $x$-axis coincident with the optical axis, $b$ is a constant large in comparison with the equivalent focal length of the objective and A ... are the coefficients of the powers of $y$ and are such that the surface will correct for the spherical aberration, coma and astigmatism of the associated spherical reflecting surface.

10. An optical objective as claimed in claim 2, in which each afocal correcting surface consists of one of the surfaces of a plate through which the light is transmitted the opposite surface of the plate being plane and turned towards the associated spherical reflecting surface, each afocal correcting surface being constituted by a surface of revolution generated by rotation about the x-axis of a curve of the form $$x = \tfrac{1}{2}\tfrac{y^2}{b} + Ay^4 + \ldots + \text{higher powers of } y$$

wherein $x$ and $y$ are the variable parameters of a Cartesian system of coordinates having at the vertex and with the $x$-axis coincident with the optical axis, $b$ is a constant large in comparison with the equivalent focal length of the objective and $A \ldots$ are the coefficients of the powers of $y$ and are such that the surface will correct for the spherical aberration, coma and astigmatism of the associated spherical reflecting surface.

11. An optical objective as claimed in claim 2, in which each afocal correcting surface is in the form of a reflecting surface and is constituted by a surface of revolution generated by rotation about the $x$-axis of a curve of the form $$x = Ay^4 + By^6 + \ldots + \text{higher even powers of } y$$

wherein $x$ and $y$ are the variable parameters of a Cartesian system of coordinates having origin at the vertex and with the $x$-axis coincident with the optical axis, and A, B $\ldots$ are the coefficients of the powers of $y$ and are such that the surface will correct for the spherical aberration, coma and astigmatism of the associated spherical reflecting surface.

12. An optical objective comprising two axially aligned spherical reflecting surfaces and two substantially afocal correcting surfaces, each constituted by one surface of a plate through which the light is transmitted, and having numerical data substantially as set forth in the following table:

| Radius | Thickness or air separation | Refractive index $n_D$ | Abbé V number |
|---|---|---|---|
| $R_1 = \infty$ | | | |
| | $D_{12} = .1$ | 1.613 | 59.3 |
| $R_2 = x = .4077y^4 + .3823y^6 + 1.0986y^8 + 1.5341y^{10}$ | | | |
| | $D_{23} = .1047$ | | |
| $R_3 = \infty$ | | | |
| | $D_{34} = .1$ | 1.613 | 59.3 |
| $R_4 = X = -.2293y^4 - .16252y^6 - .7662y^8 - .58557y^{10}$ | | | |
| | $D_{45} = .8333$ | | |
| $R_5 = -1.0$ | | | |
| | $D_{56} = -.25$ | | |
| $R_6 = -1.0$ | | | |

Distance of focal plane F from $R_6 = +.50$.
Equivalent focal length 1.000.

Wherein $R_1 R_2 \ldots$ represent the axial radii of "curvature of the individual surfaces for which the equations of the generating curve are given in Cartesian coordinates $x$, $y$, and $D_{12} \ldots$ represent the axial air separations between the vertices of the individual surfaces."

13. An optical objective comprising two axially aligned spherical reflecting surfaces and two substantially afocal reflecting correcting surfaces, and having numerical data substantially as set forth in the following table:

| Radius | Air separation |
|---|---|
| $R_1 = +1.0$ | |
| | $D_{12} = -.25$ |
| $R_2 = +1.0$ | |
| | $D_{23} = .83$ |
| $R_3 = x = -.625y^4 + \text{higher order terms.}$ | |
| | $D_{34} = -.17$ |
| $R_4 = x = -1.125y^4 + \text{higher order terms.}$ | |

Distance of focal plane from $R_4 = +.50$.
Equivalent focal length 1.000.

Wherein $R_1 R_2 \ldots$ represent the axial radii of "curvature of the individual surfaces for which the equations of the generating curve are given in Cartesian coordinates $x$, $y$, and $D_{12} \ldots$ represent the axial air separations between the vertices of the individual surfaces."

14. An optical objective comprising two axially aligned spherical reflecting surfaces and two substantially afocal correcting surfaces each constituted by one surface of a plate through which the light is transmitted, and having numerical data substantially as set forth in the following table:

| Radius | Thickness or air separation | Refractive index $n_D$ |
|---|---|---|
| $R_1 = x = +.1595y^2 - .4900y^4 + \text{higher order terms.}$ | | |
| | $D_{12} = .065$ | 1.5 |
| $R_2 = \infty$ | | |
| | $D_{23} = .090$ | |
| $R_3 = x = -.0935y^2 + .2967y^4 + \text{higher order terms.}$ | | |
| | $D_{34} = .065$ | 1.5 |
| $R_4 = \infty$ | | |
| | $D_{45} = .761$ | |
| $R_5 = -.9451$ | | |
| | $D_{56} = -.227$ | |
| $R_6 = -.9091$ | | |

Distance of focal plane F from $R_6 = +.462$.
Equivalent focal length 1.000.

Wherein $R_1 R_2 \ldots$ represent the axial radii of "curvature of the individual surfaces for which the equations of the generating curve are given in Cartesian coordinates $x$, $y$, and $D_{12} \ldots$ represent the axial air separations between the vertices of the individual surfaces."

15. An optical objective comprising in combination a plurality of spherical reflecting surfaces in axial alignment, of which at least one is convergent and at least one divergent, and means for effecting correction of the spherical aberration, coma and astigmatism of such surfaces, the said means including at least one substantially afocal reflecting correcting surface intersecting the optical axis substantially at the equivalent center of curvature of one of the spherical reflecting surfaces, the combination being such as to produce an approximately flat image field.

ARTHUR WARMISHAM